US007490084B2

(12) United States Patent
Kothuri et al.

(10) Patent No.: US 7,490,084 B2
(45) Date of Patent: Feb. 10, 2009

(54) DEFERRED INCORPORATION OF UPDATES FOR SPATIAL INDEXES

(75) Inventors: Ravikanth V. Kothuri, Nashua, NH (US); Siva Ravada, Nashua, NH (US); Ning An, Nashua, NH (US)

(73) Assignee: Oracle Corporation, Redwood Shores, CA (US)

( * ) Notice: Subject to any disclaimer, the term of this patent is extended or adjusted under 35 U.S.C. 154(b) by 343 days.

(21) Appl. No.: 10/948,459

(22) Filed: Sep. 24, 2004

(65) Prior Publication Data

US 2006/0074977 A1    Apr. 6, 2006

(51) Int. Cl.
*G06F 17/30* (2006.01)
(52) U.S. Cl. .............................. 707/8; 707/2; 707/101; 707/202
(58) Field of Classification Search .................... 707/2, 707/8, 100, 200, 201, 101, 202
See application file for complete search history.

(56) References Cited

U.S. PATENT DOCUMENTS

| | | | | |
|---|---|---|---|---|
| 6,026,406 A | * | 2/2000 | Huang et al. | 707/100 |
| 6,769,003 B2 | * | 7/2004 | Park et al. | 707/202 |
| 7,103,587 B2 | * | 9/2006 | Lindsay et al. | 707/2 |

OTHER PUBLICATIONS

N. An, R.K.V. Kothuri and S. Ravada, Improving Performance with Bulk-Inserts in Oracle R-Trees, Proceedings of the 29th VLDB Conference, Sep. 9-12, 2003, Morgan Kaufman 2003, ISBN 0-12-722442-4; pp. 948-951.*
R.K.V. Kothuri, S. Ravada and N. An, Incorporating updates in domain indexes: experiences with Oracle spatial R-trees, Data Engineering, 2004. Proceedings. 20th International Conference on, vol., Iss., Mar. 30-Apr. 2, 2004; pp. 745-753.*

* cited by examiner

*Primary Examiner*—Shahid A Alam
*Assistant Examiner*—Jason L Alvesteffer
(74) *Attorney, Agent, or Firm*—Hanify & King, P.C.

(57) ABSTRACT

The present invention provides techniques by which updates may be incorporated in database indexes without causing deadlocks of user transactions. In deferred-incorporate update, the updates are propagated to the index only at transaction commit time. A method of handling transactions including updates in a database management system comprises the steps of receiving an update to a database maintained by the database management system, the update operable to cause an index of the database to be modified, recording the update in a log, and receiving an indication that the transaction is to be committed and in response, incorporating the update from the log into an index of the database. The update may comprise an insert operation and/or a delete operation.

45 Claims, 7 Drawing Sheets

DEFERRED INCORPORATION OF UPDATES FOR SPATIAL INDEXES

FIELD OF THE INVENTION

The present invention relates to updates for indexes on databases, such as spatial databases, wherein the updates are deferred until commit time.

BACKGROUND OF THE INVENTION

Over the past decade, traditional database techniques were found inadequate to completely address the needs of domain-specific applications. To this end, domain-specific extensions like spatial, text, XML, or genetic databases have been designed to cater to the specific needs of the industry and have been proven quite successful. Most research in databases has consequently been focused on addressing the idiosyncrasies of these domain applications by using, and extending existing database technology or inventing novel database techniques. Indexing of domain data to cater to domain specific queries is one such area that has received much attention. Spatial researchers proposed many efficient indexes for storage and retrieval of spatial data in databases. The text community has devised new and efficient indexes for text data. XML researchers have proposed new structures for searching on the tree structure semantics of XML documents.

Efficient update algorithms for domain indexes have also been proposed. These include insertion, deletion in bulk, sub tree merging, buffering-based updates, etc. Most of these proposals consider the operations in isolation. Other proposals study and propose new concurrency models for domain indexes.

The problem of incorporating transactional updates in hierarchical spatial indexes like R-trees has also received much attention in research. R-trees have a hierarchical tree structure. Each node of the tree is stored as a row in an index table. The leaf-level of the R-tree stores pointers to rows of a user table that is indexed by the R-tree. A problem arises if updates to user table are incorporated as part of the user transaction, since the updates may conflict at the R-tree node level even if the underlying updates from two different transactions do not conflict. This could lead to deadlocks even when the transactions do not conflict if the index were not to be there.

A need arises for a technique by which updates may be incorporated in Spatial R-tree indexes without causing deadlocks of user transactions.

SUMMARY OF THE INVENTION

The present invention provides techniques by which updates may be incorporated in database indexes without causing deadlocks of user transactions. In one embodiment, referred to as immediate-incorporate, updates are incorporated in the index at the time of occurrence of the data manipulation language (DML) command execution. In a particular embodiment, the R-tree updates are incorporated as part of system transactions. The system transactions commit the update changes to the index but do not make them visible to other transactions. At commit time, the changes are made visible to other transactions.

In another embodiment, referred to as deferred-incorporate, the updates are propagated to the index only at transaction commit time. In particular, the updates are logged in a separate table and applied at transaction commit time. At commit time, bulk updates are performed. Several efficient strategies for queries in the active transaction are preferred. These include filtering the deferred table (containing the updates) using the minimum bounding rectangle (MBR) of the query window.

In one embodiment of the present invention, a method of handling transactions including updates in a database management system comprises the steps of receiving an update to a database maintained by the database management system, the update operable to cause an index of the database to be modified, recording the update in a log, and receiving an indication that the transaction is to be committed and in response, incorporating the update from the log into an index of the database. The update may comprise an insert operation, which inserts data into the database, a delete operation, which deletes data from the database, or an update operation, which modifies data in the database. The step of receiving an update may comprise the step of in response to receiving the update, invoking a callback to update the index. The step of invoking a callback may comprise the step of passing information relating to the index and information identifying the data to be updated. The log may comprise an insert-log operable to store insert operations and a delete-log operable to store delete operations. The step of recording the update in a log may comprise the steps of registering the callback with a transaction manager, if the update is the first update in the transaction, including the index in a list of indexes used in the transaction, if the update is the first update to the index in the transaction, if the update is an insert operation, inserting the insert operation into the insert-log, if the update is a delete operation and there is not an insert operation corresponding to the data to be deleted in the insert-log, inserting the delete operation into the delete-log, and if the update is a delete operation and there is an insert operation corresponding to the data to be deleted in the insert-log deleting the insert from the insert-log. The step of recording the update in a log may further comprise the steps of if the update is an update operation and there is an insert operation corresponding to the data to be deleted in the insert-log, updating the insert-log data with the new values in the update, and inserting the old value in the delete-log and the new value in the insert-log, otherwise.

The step of incorporating the update from the log into an index of the database may comprise the steps of retrieving the list of indexes used in the transaction and for each index in the list of indexes, performing the steps of locking the index for update, performing delete operations in the delete-log on the index and performing insert operations in the insert-log on the index. The step of incorporating the update from the log into an index of the database may further comprise, for each index in the list of indexes, the steps of consulting the index to form a result set, consulting the delete-log and subtracting delete-log results from the result set, and consulting the insert-log and adding insert-log results to the result-set. The step of consulting the delete-log may comprise the steps of comparing a query key with an in-memory extent of keys in the delete-log, storing the in-memory extent in a transaction context, and scanning the delete-log and retrieving data in the delete-log that intersect with the query key, if the in-memory extent overlaps with the query key. The step of scanning the delete-log may comprise the step of specifying the query key as a filter condition. The step of consulting the insert-log may comprise the steps of comparing a query key with an in-memory extent of keys in the insert-log, storing the in-memory extent in a transaction context, and scanning the insert-log and retrieving data in the insert-log that intersect with the query key, if the in-memory extent overlaps with the query key. The step of scanning the insert-log comprises the step of specifying the query key as a filter condition.

The database may be a relational database. The database may be a spatial database and the index may be a spatial index on the spatial database. The index may comprise a Quadtree index or an R-tree index. The database may be an inventory control database. The inventory control database may utilize radio frequency identification tags.

The step of incorporating the update from the log into an index of the database may comprise the step of performing array/batch updating of the index.. The array/batch size may be set in the range of 1000 to 10000.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
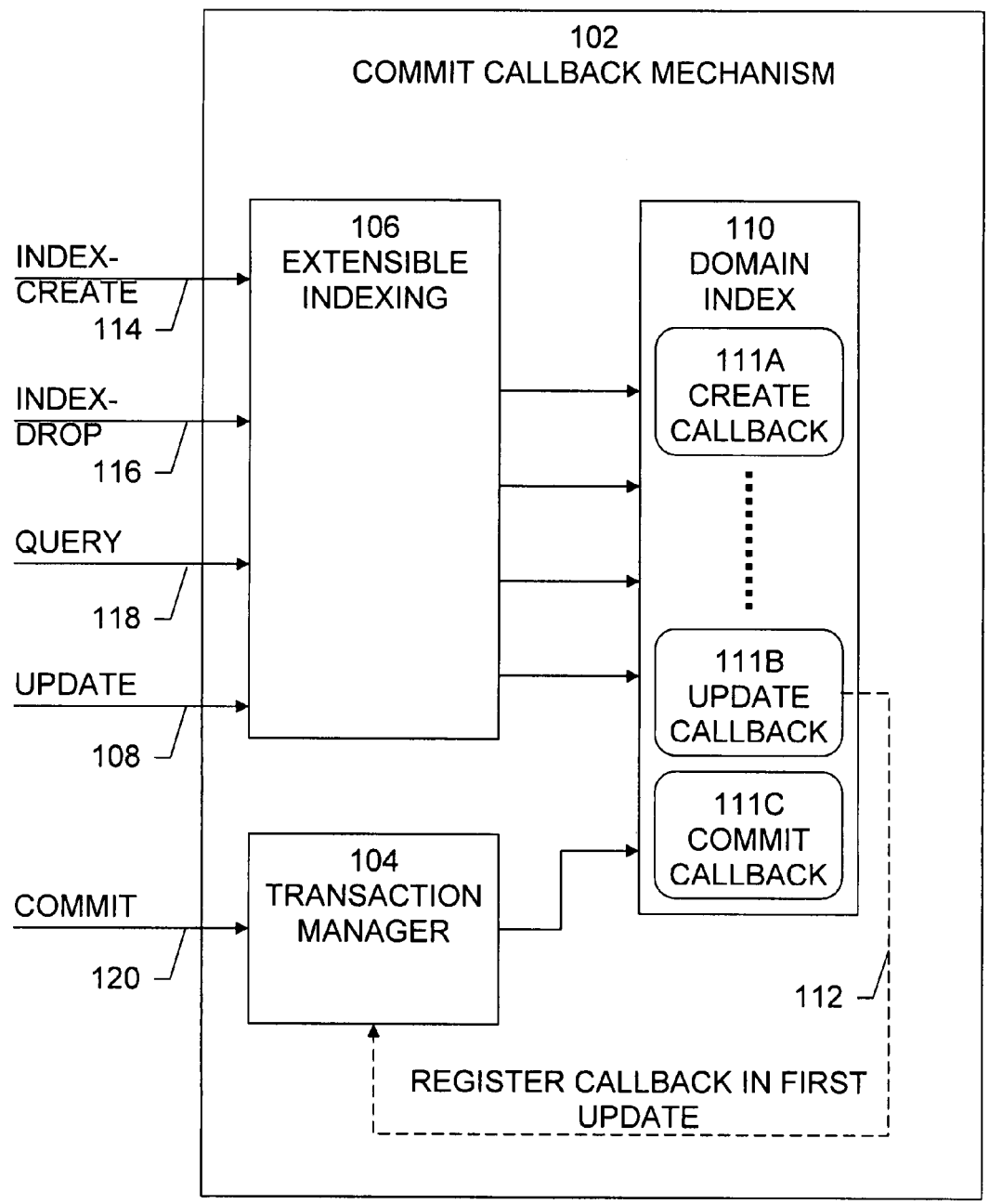
FIG. 1 is an exemplary block diagram of a mechanism for performing commit callbacks.

Preferably, a Database Management System (DBMS), in which the present invention may be implemented, will support at least two of the four levels of isolation described in the well-known Structured Query Language (SQL) standard: read-committed isolation and serializable isolation. In a serializable isolation level, each query in a transaction reads data committed at the beginning of the transaction. In this model, queries may be blocked due to conflicting updates. In contrast, in a read-committed isolation level, each query in a transaction reads data committed at the beginning of the query rather than at the beginning of the transaction. In this isolation, queries are answered using committed versions of data and are never blocked due to updates from concurrent active transactions. This results in high concurrency and high throughput for practical query-update workloads in most applications. Many spatial applications use the read-committed isolation. Serializable isolation is available in many commercial database servers, but read-committed isolation is not as widely available. The present invention is applicable to both isolation levels.

To facilitate the integration of domain-specific solutions into commercial database kernels, many DBMSs provide an extensible indexing framework. This framework allows for the creation of new domain specific indexes and associated query operators and provides for the integration of user-specified query, update and index creation routines inside database server. For example, the ORACLE SPATIAL® system supports a "spatial_index" indextype for indexing spatial data. Quadtree and R-tree indexes are supported as part of this "spatial_index" indextype. Since these indexes are implemented as part of the extensible indexing framework, spatial indexes can be easily created on "sdo_geometry" columns of database tables using an extended SQL syntax. As part of such index creation, the corresponding spatial index creation routines are executed and the constructed spatial index is stored in the database as a "spatial_index" table. The index table stores index information such as R-tree nodes in the case of R-trees and Quadtree tiles in the case of Quadtrees. The metadata for the entire index is stored as a row in a separate metadata table. This metadata includes the name of the index table storing the index, dimensionality, fanout, root pointer and other parameters for an R-tree and the tiling level parameter for a Quadtree index. It is to be noted that the ORACLE SPATIAL® system is merely an example of a system in which the present invention may be implemented. The present invention contemplates implementation in any DBMS.

Although the extensible indexing framework provides a callback-based mechanism for basic operations such as index creation, query operators, and DML operations, it does not guarantee deadlock-free transactional behaviors of the associated callbacks. All callbacks, by default, execute in the user transaction for the specified operation. As a result, two update operations on a hierarchical index, such as an R-tree, from two different transactions could block each other, resulting in a deadlock. Since all transactional locks are released only at commit/rollback time, commit/rollback time callbacks are essential to meaningfully implement any extensible domain index that can cater to transactional semantics.

An exemplary mechanism 102 for performing commit callbacks is shown in FIG. 1. Commit callbacks allow users to register a call-back with a transaction manager (TM) 104, which controls the steps in the performance of transactions. At commit and rollback times, this registered call-back is invoked by the TM. Domain indexes could be enhanced by combining extensible indexing 106 with commit-time callback mechanism. For instance, an update operation 108 using a domain-index 110 could create 111A a commit-time update call-back 111B. Whenever a user performs a Data Manipulation Language (DML) command in a new transaction, the call-back 111B will be registered 112 with the TM 104. When the transaction commits, the TM will call the registered commit call-back 111C. In addition to callbacks created for the insert (index-create) 114, delete (index-drop) 116, update 108, and query 118 operations for the domain index 110 provided through extensible indexing 106, the present invention provides an additional callback created at commit-time 120, as illustrated in FIG. 1. Note that this combination of extensible indexing callbacks and commit callbacks of the transaction manager provides a unified framework for managing transactional updates on domain indexes and gives more control to domain index implementers as to when to perform redo/undo on associated domain index tables/structures.

Figure 2:
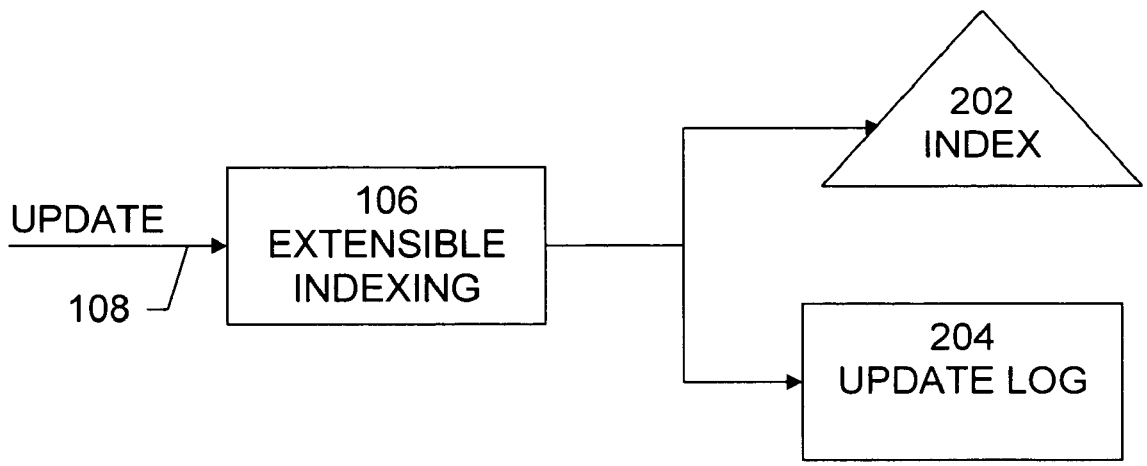
FIG. 2 is an exemplary data flow diagram of the immediate-incorporate approach.
Figure 2:
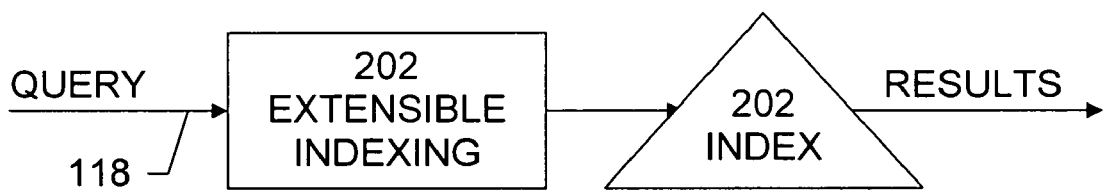
Figure 2:
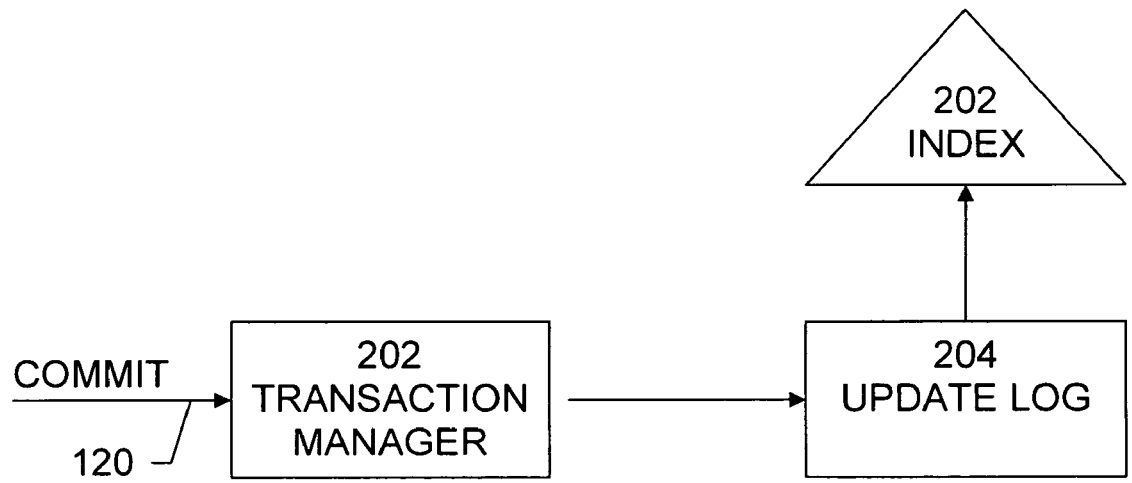

In the immediate-incorporate approach each update is incorporated in the index immediately, i.e., at the time of the update. This approach is generally used in most indexing systems. However, as discussed earlier, if the update is applied as part of the user transaction, this could result in a deadlock with other transactions. Instead, in the present invention, the update is performed as part of a system transaction that commits at the end of the update. Since the update should not be visible to other transactions, the updated record in the index is appended with a transaction-id (txn-id). This txn-id masks the index entry from being visible to other concurrent transactions or queries. This is advantageous in DBMSs in which queries are not blocked so they can read data committed at the beginning of the query or at the beginning of the transaction. The txn-id is reset at commit time to make the entry visible to other entries. An exemplary data flow diagram of the immediate-incorporate approach is shown in FIG. 2.

During each update operation 108 performed through extensible indexing 106, the following actions are performed:

If the update operation 108 is the first in the transaction, a callback is registered with the transaction manager (TM) 104. This callback will be invoked at commit/rollback time and is used to perform commit or rollback-time processing on index 202.

As part of a system transaction, the update is incorporated in the index 202. The index record is tagged with the txn-id of the parent user transaction so that the entry is not visible to any other transaction except the parent user transaction.

The update is logged in update log 204 for subsequent undo at rollback time. The same information can also be used to reset txn-ids at commit time. Note that these update logs are maintained as temporary tables in the database as domain indexes do not have access to the transactional undo/redo logs.

Typically, there is considerable overhead associated with this process. Note that each update is incorporated one after the other in the index. This means looking up index information and traversing the index for update in every update operation.

At commit time 120, using the information in the updatelog table 204, the txn-ids of the corresponding records in index 202 are reset. This makes the update changes visible to transactions/ queries that start after the commit operation. Note that the index node where an update occurred could be kept track of and can be used for fast resetting of the txn-id for that index record. However, when there are a large number of updates such tracking information could become outdated (i.e., index records may move due to node-splits etc.) and may not be always helpful in speeding up the commit time processing.

At rollback time, the updates need to be undone on the index. This information is obtained from the update-log 204. To facilitate partial rollbacks to savepoints, each update operation is tagged with a sequence-number. All updates following the sequence-number at save-points specified in the rollback are rolled back from the index 202. In short, rollback is a more costly operation than commit. In addition, maintaining the sequence-numbers (just to support rollbacks), poses additional overheads for update operations.

Queries 118 on the index ignore all index entries whose txn-ids are set and do not match that of the current user transaction. Since queries are processed just from the index 202 (without having to consult the update logs) and only have to check for visibility of index records in the transaction, there are little or no additional overheads imposed on the query in a transaction.

In short, this approach minimizes the overheads for queries in other transactions. It, however, has high overheads for both update and commit/rollback operations.

Figure 3:
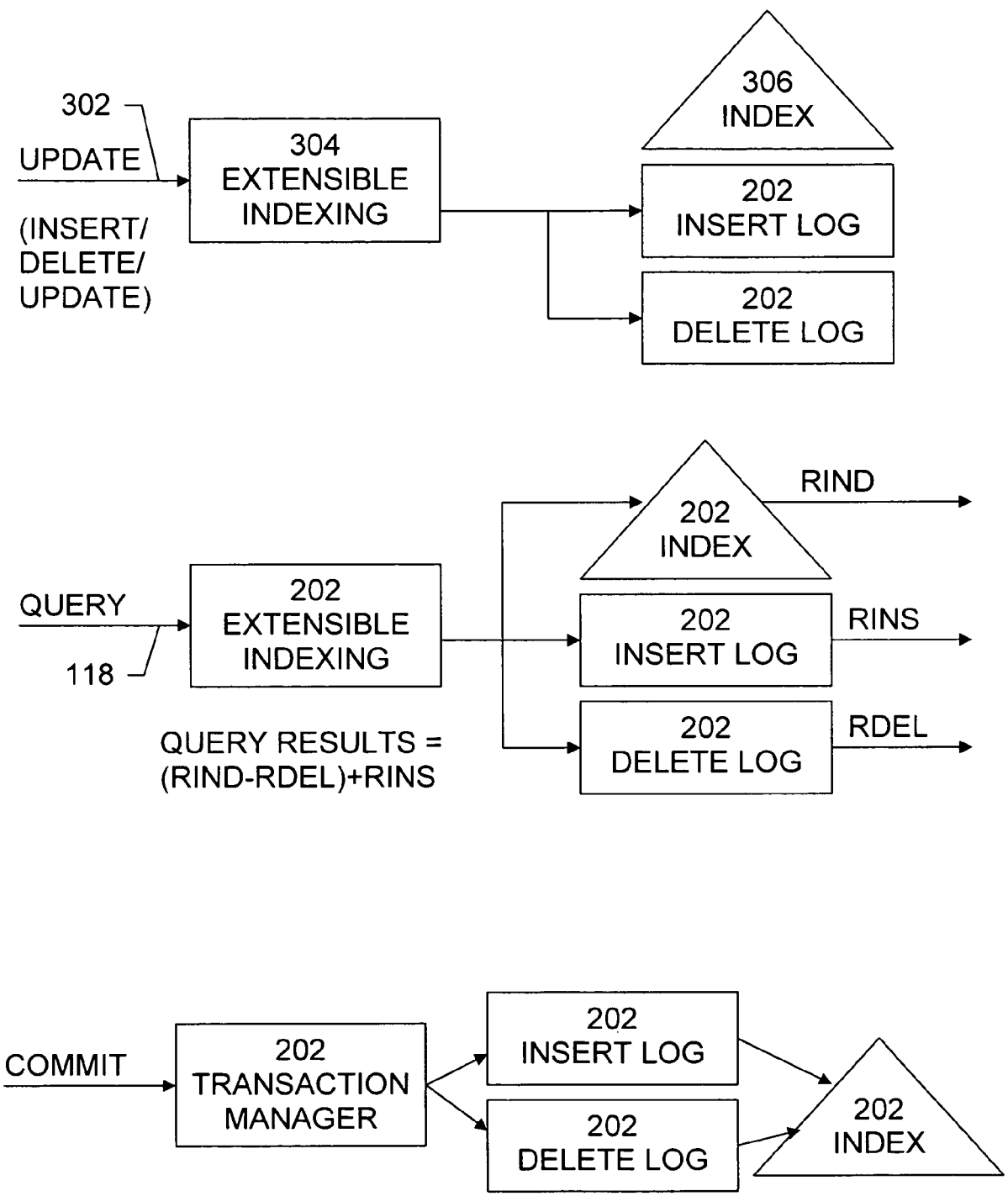
FIG. 3 is an exemplary data flow diagram of the deferred-incorporate approach.

In the deferred-incorporate approach updates are deferred in temporary tables associated with the index. These updates are incorporated in the index only at commit time. An exemplary data flow diagram of the deferred-incorporate approach is shown in FIG. 3. As illustrated in FIG. 3, update operations only log the operations. They are incorporated in the index at commit time.

Figure 4:
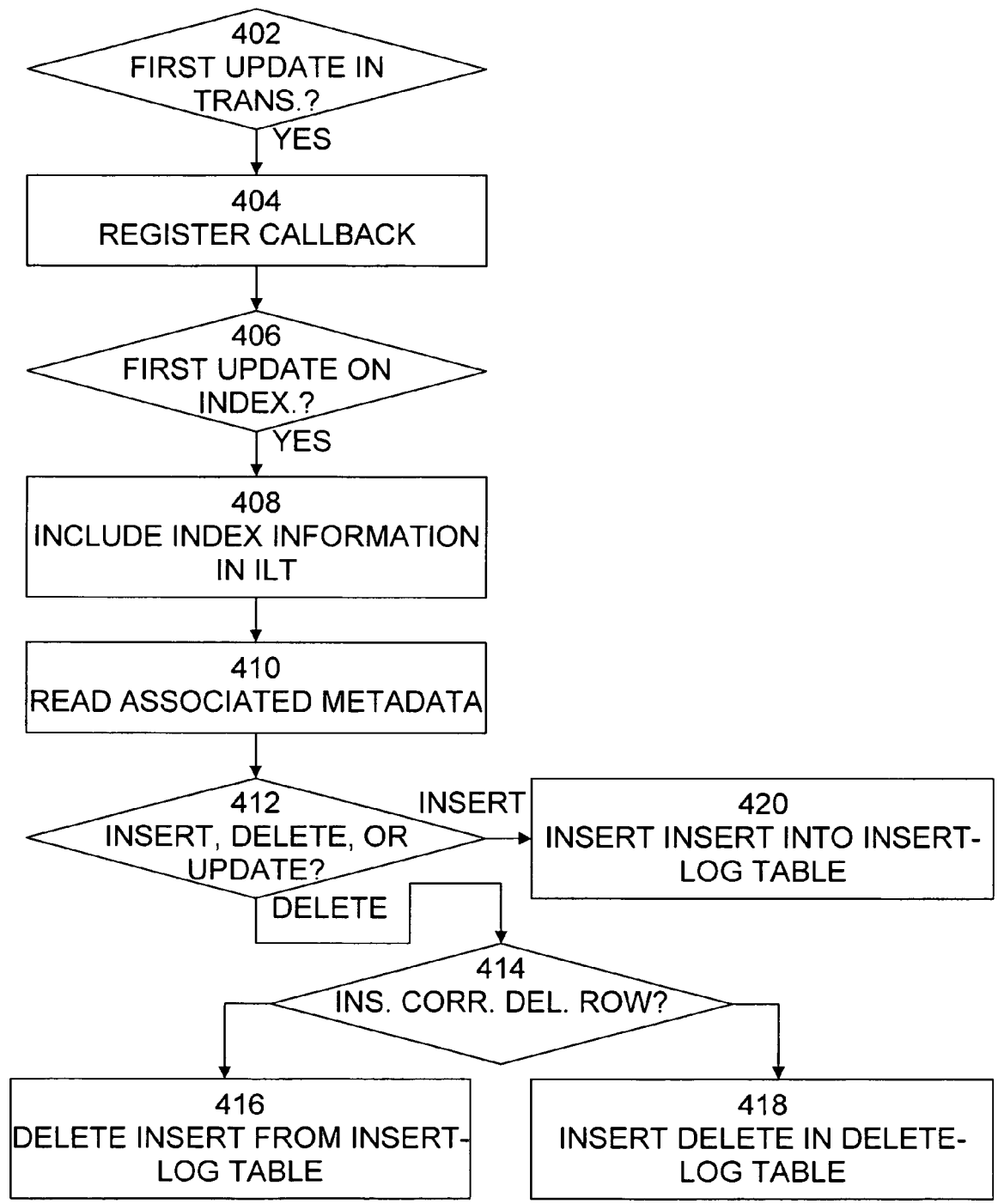
FIG. 4 is an exemplary flow diagram of a deferred update process.

Each update 302 (insert, delete, or update operation) of a row in a spatially-indexed table invokes a corresponding extensible-indexing 304 callback to update the spatial index 306. The extensible indexing callback passes in information about the index 306, the rowid of the row in the table being updated, the spatial column value (key) for that row. Instead of applying this update on the spatial index right away, the operation is deferred until transaction commit time as shown in FIG. 4, which is a flow diagram of a deferred update process 400. Process 400 begins with step 402, in which it is determined whether the update is the first in the transaction. If the update is the first in the transaction, then in step 404, a callback for the transaction is registered with the transaction manager. In addition, the transaction manager provides the capability to associate and manage a data structure with the transaction callback. For spatial indexes, this data structure contains a list of all indexes that need processing at commit time for this transaction and is referred to as the Index-List-for-Transaction (ILT).

In step 406, it is determined whether the update is the first one on the associated index. If so, then in step 408, the index information is included in the ILT for the transaction. The ILT is kept sorted on (index-schema, indexname). The transaction manager ensures exclusive access to the ILT with the use of latches.

In step 410, the associated metadata for the index is read in an autonomous (system) transaction. This metadata is used to compute the minimum bounding rectangle (mbr) for the spatial key. If the update is an insert, then the (mbr, rowid) information is logged in the insert-log table.

In step 412 it is determined whether the operation is an insert operation, a delete operation, or an update operation. Update operations are treated as delete operations followed by insert operations. If the operation is a delete operation, then in step 414, it is determined whether there is an insert operation corresponding to the deleted row in the insert-log table. If so, then in step 416, that insert operation is deleted from the insert-log table. Otherwise, in step 418, the delete operation is inserted in a delete-log table. If, in step 412, it is determined that the operation is an insert operation, then in step 420, the insert operation is inserted into the insert-log. Note that separating the updates and putting them in insert-log and delete-log tables speeds up the checks in this step.

Figure 5:
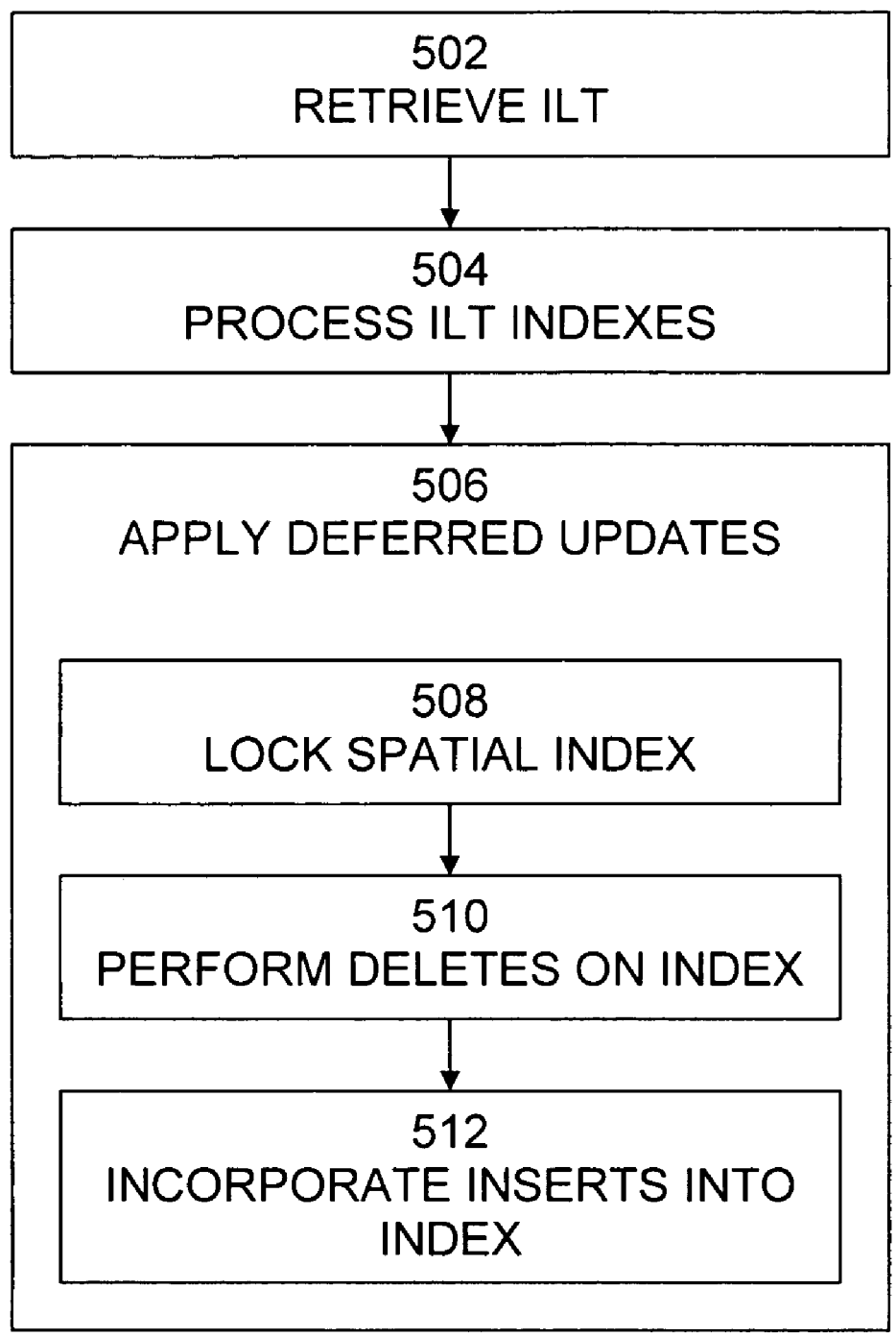
FIG. 5 is an exemplary flow diagram of a registered callback invocation process.

At commit time, the registered callback for each transaction is invoked, as shown in FIG. 5, which is an exemplary flow diagram of a registered callback invocation process 500. Process 500 begins with step 502, in which the ILT is retrieved. In step 504, the indexes in the ILT are processed in ascending order of the (index-schema, index-name). In step 506, for each index in the ILT, the corresponding deferred updates are applied as follows:

In step 508, the associated spatial index is exclusively locked by selecting the index metadata for update. This serializes concurrent commit operations of different transactions operating on the same index.

In step 510, all deletes in the delete-log table are performed on the spatial index. Preferably, deletes are performed in batches and not as singletons.

In step 512, all inserts from the insert-log table are incorporated in the spatial index. Just like deletes, these inserts are also preferably performed in batches.

The insert-log and the delete-log are preferably implemented as transaction-specific temporary tables in the DBMS. As a result, the logs store data specific to each transaction and are automatically cleaned-up by the DBMS after a commit operation.

At the time of rollback, the DBMS rolls back the operations in the logs appropriately. If the rollback is a partial rollback, i.e., the rollback is to a specified savepoint, the logs are also rolled back partially to the specified savepoint by the DBMS. This means with the deferred-incorporate approach there is no explicit processing that needs to be done by the domain (R-tree) index for (any type of) rollback operations.

Figure 6:
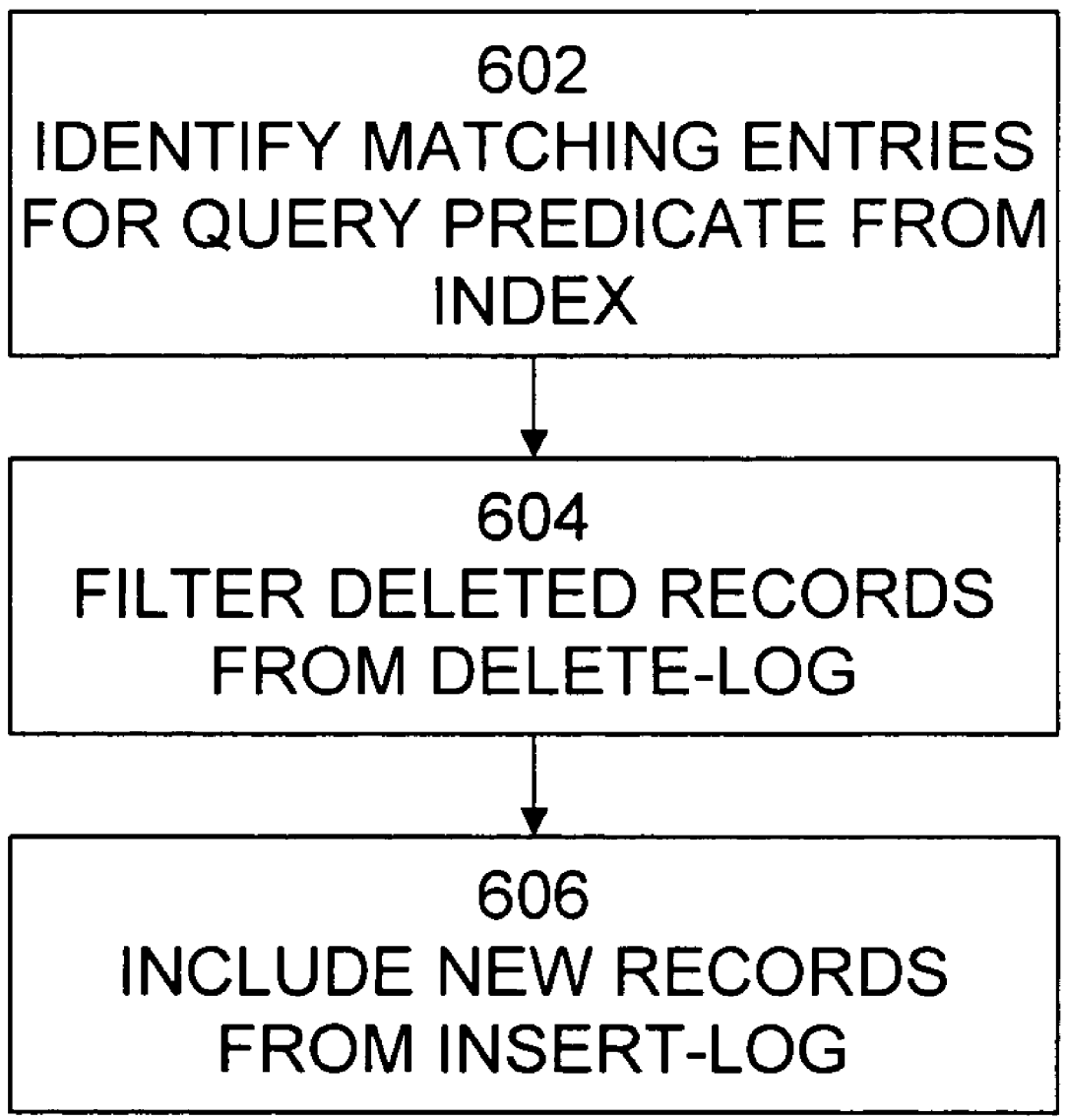
FIG. 6 is an exemplary flow diagram of query processing.

Queries in the same transaction as updates, however, have to do additional processing to consult the insert-log and delete-log tables in addition to the index. Each query is processed as shown in FIG. 6, which is an exemplary flow diagram of query processing 600. Process 600 begins with step 602, in which the query identifies matching entries for the query predicate from the index. In step 604, deleted records are filtered out from the delete-log table. In step 606, new records are included from the insert-log table. If the isolation level is set to read-committed (i.e., the default level), queries in the ensuing transactions are never blocked due to concurrent updates.

Since queries need to consult the insert-log and delete-log tables, a number of optimizations may be applied in order to speed up the query. Examples of such optimizations include:

Maintaining the extents of the record keys in delete-log table and insert-log table. The query is first compared with these extents before even accessing the tables. This helps in improving query performance significantly whenever the query window falls outside the scope of the updates.

Specifying the query predicate (MBR) in the scan for the insert-log and the delete-log files. So, the SQL statement is appended with a where clause that has query MBR as a filtering criterion. This way only those update records that intersect with the query predicate extent are retrieved. This helps in speeding up query performance when the number of updates is large.

The deferred-incorporate approach described above may be further refined by the use of optimizations for particular situations. For example, queries in the deferred-incorporate approach which have a high overhead may be improved by using the query minimum bounding rectangle (MBR) as a filter-predicate in the scan. Tests have shown that the query performance may be greatly improved by this optimization. Similar results may also be obtained by pruning using the extents of the delete-log and the insert-log tables. In this case, the random-query windows that are less likely to interact with the inserted data MBRs typically shown the greatest improvement in performance. Combining both optimizations may provide even greater performance improvement.

Tests have also shown that the insertion times for deferred-incorporate are much smaller than those for immediate-incorporate. Immediate-incorporate is slower for three reasons: (1) the need for incorporating updates in the index, (2) reading metadata in each update, and (3) the overheads of operating and updating in system transactions. Unlike the deferred-incorporate approach, immediate-incorporate could pay the indexing costs two times: once at update time, and a second time during commit (or roll back). However, commit times are typically better for the immediate-incorporate approach. This is because immediate-incorporate only has to reset txn-ids of index records at commit time and does much less work compared to deferred-incorporate. However, in some cases, the index records and the txn-ids could migrate due to node splits eliminating some advantages over immediate-incorporate.

Query times for deferred-incorporate are typically comparable to those for immediate-incorporate for relatively small numbers of operations. For larger numbers of operations, query times for deferred-incorporate increase. This is because of the increasing overheads of having to scan and process large insert/delete-log tables in query.

The deferred-incorporate approach is typically much faster for delete operations and comparable or slightly slower for commit times. As in the case of insertion workloads, the times for the queries are comparable as long as the number of delete operations does not exceed the lower thousands. Since most transactions fall in this category, deferred-incorporate will be suitable for these workloads.

Rollback operations for deferred-incorporate are typically much faster compared to immediate-incorporate. In deferred-incorporate, the insert and delete-log tables are rolled back implicitly. Other than that, there is no specific processing to be done. However, in immediate-incorporate, the processing will take at least as much time as a commit operation.

Finally, deferring updates till commit time can take advantage of array inserts and array deletes into domain indexes. Such optimizations cannot be performed in immediate-incorporate as the updates are incorporated in the index as they arrive (no batching is possible). This bridges the gap in commit-times and puts deferred-incorporate on par with immediate-incorporate.

From the testing that was performed, it is clear that the deferred-incorporate approach is faster for all operations in transactions that involve small number of updates. For transactions with large number of updates, the commit times of deferred-incorporate (using array updates) are, at worst, only slightly slower than in immediate-incorporate. In such transactions, queries, however, could be significantly slower. In most large-update transactions, queries are very few or even non-existent, in comparison to updates. As a result, the gains from the updates for deferred-incorporate are likely to dominate in real-world applications.

To ensure best performance in all scenarios, a hybrid mechanism could be employed where the updates are deferred till the transaction has a substantial (say 5000) number of updates. At that point, the updates could be incorporated as part of a system (autonomous) transaction in the domain index. For such transactions, the updates would be incorporated in batches of 5000 after every 5000th update operation. This strategy combines the best of both approaches: it behaves as deferred-incorporate for small transactions and as batched-immediate-incorporate for large transactions. This hybrid approach combines the fast update times of deferred-incorporate and fast query and commit times of immediate-incorporate. The only operation that could still be slow is full or partial rollbacks (just as in immediate-incorporate). In general, if only the deferred-incorporate mechanism is supported, then the users could divide their large transactions to smaller batches of updates to maximize overall system throughput.

Figure 7:
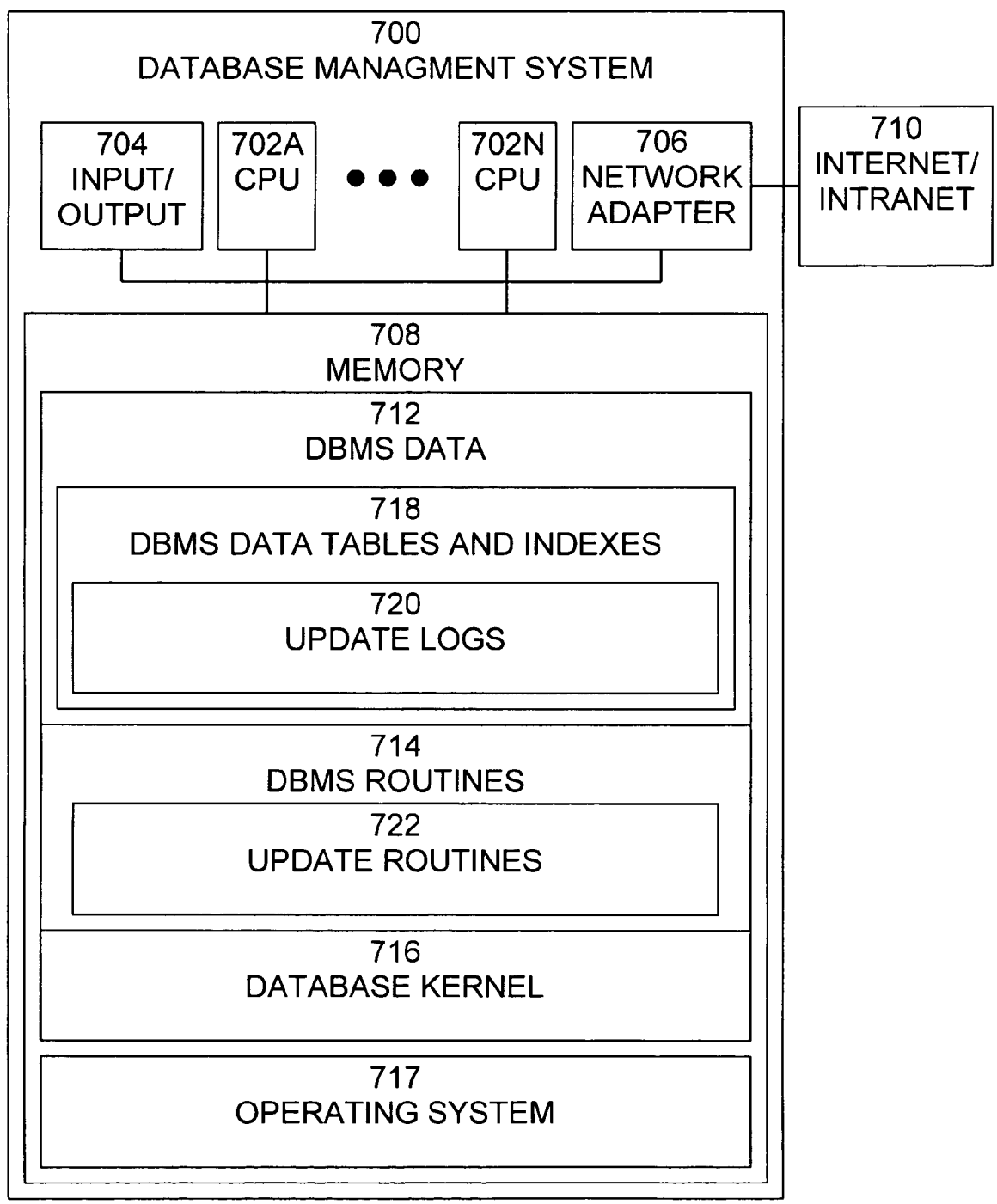
FIG. 7 is an exemplary block diagram of a database management system (DBMS), in which the present invention may be implemented.

An exemplary block diagram of a database management system (DBMS) 700, in which the present invention may be implemented, is shown in FIG. 7. System 700 is typically a programmed general-purpose computer system, such as a personal computer, workstation, server system, and minicomputer or mainframe computer. DBMS 700 includes one or more processors (CPUs) 702A-702N, input/output circuitry 704, network adapter 706, and memory 708. CPUs 702A-702N execute program instructions in order to carry out the functions of the present invention. Typically, CPUs 702A-702N are one or more microprocessors, such as an INTEL PENTIUM® processor. FIG. 7 illustrates an embodiment in which DBMS 700 is implemented as a single multiprocessor computer system, in which multiple processors 702A-702N share system resources, such as memory 708, input/output circuitry 704, and network adapter 706. However, the present invention also contemplates embodiments in which DBMS 700 is implemented as a plurality of networked computer systems, which may be single-processor computer systems, multi-processor computer systems, or a mix thereof.

Input/output circuitry 704 provides the capability to input data to, or output data from, database/System 700. For example, input/output circuitry may include input devices, such as keyboards, mice, touchpads, trackballs, scanners, etc., output devices, such as video adapters, monitors, printers, etc., and input/output devices, such as, modems, etc. Network adapter 706 interfaces database/System 700 with Internet/intranet 710. Internet/intranet 710 may include one or more standard local area network (LAN) or wide area network (WAN), such as Ethernet, Token Ring, the Internet, or a private or proprietary LAN/WAN.

Memory 708 stores program instructions that are executed by, and data that are used and processed by, CPU 702 to perform the functions of system 700. Memory 708 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 7, memory 708 includes database management system (DBMS) data 712, DBMS routines 714, database kernel 716 and operating system 717. DBMS data 710 includes DBMS data tables and indexes 718. DBMS data tables 718 include a plurality of data tables, such as relational database data tables, and a plurality of indexes on those data tables. In particular, in a preferred embodiment, DBMS data tables and indexes 718 include update logs 720. In this embodiment, update logs 720, which may include insert-logs and delete-logs, are maintained as temporary data tables in the DBMS. This provides significant DBMS functionality to be transparently provided to the maintenance of the logs. For example, the DBMS will transparently provide crash recovery and clean-up services to the logs, as it would for any temporary tables. This is transparent to the update mechanism. Typically, the duration of the temporary tables will be the duration of the transaction.

DBMS routines 712 provide the functionality of DBMS in which the present invention is implemented, such as low-level database management functions, such as those that perform accesses to the database and store or retrieve data in the database. Such functions are often termed queries and are performed by using a database query language, such as Structured Query Language (SQL). SQL is a standardized query language for requesting information from a database. DBMS routines 714 include update routines 722, which provide the update mechanism functionality of the present invention. Database kernel 716 provides overall DBMS functionality. Operating system 717 provides overall system functionality.

As shown in FIG. 7, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although the present invention has been exemplified with reference to a spatial database system, one of skill in the art would recognize that the present invention is equally applicable to other types of database systems as well. For example, the present invention may be advantageously applied to a Radio Frequency Identification (RFID) system. In an RFID system, RFID tags containing RFID integrated circuits are affixed to various items to be tracked. The system could have a "domain" index on the RFID tags (just like spatial databases have R-tree or quadtree indexes on spatial columns of tables). When an item is purchased, the RFID tag is scanned and an inventory control database may be updated to reflect the purchase. The updates to the domain index in such a database may be advantageously implemented by use of the present invention to incorporate the updates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of handling transactions including updates in a database management system comprising the steps of:
   receiving an update to a database maintained by the database management system, the update causing an index of the database to be modified;
   recording the update in a log; and
   receiving an indication that the transaction is to be committed and in response, incorporating the update from the log into an index of the database;
   wherein the update comprises an insert operation, which inserts data into the database, a delete operation, which deletes data from the database, or an update operation, which modifies data in the database;

wherein the step of receiving an update comprises the step of, in response to receiving the update, invoking a callback to update the index, wherein the step of invoking a callback comprises the step of passing information relating to the index and information identifying the data to be updated;

wherein the log comprises an insert-log storing insert operations and a delete-log storing delete operations; and wherein the step of recording the update in a log comprises the steps of:

registering the callback with a transaction manager, if the update is the first update in the transaction;

including the index in a list of indexes used in the transaction, if the update is the first update to the index in the transaction;

if the update is an insert operation, inserting the insert operation into the insert-log;

if the update is a delete operation and there is not an insert operation corresponding to the data to be deleted in the insert-log, inserting the delete operation into the delete-log; and if the update is a delete operation and there is an insert operation corresponding to the data to be deleted in the insert-log deleting the insert from the insert-log.

2. The method of claim 1, wherein the step of recording the update in a log further comprises the steps of:

if the update is an update operation and there is an insert operation corresponding to the data to be deleted in the insert-log, updating the insert-log data with the new values in the update; and inserting the old value in the delete-log and the new value in the insert-log, otherwise.

3. The method of claim 1, wherein the step of incorporating the update from the log into an index of the database comprises the steps of:

retrieving the list of indexes used in the transaction;

for each index in the list of indexes, performing the steps of:

locking the index for update;

performing delete operations in the delete-log on the index; and performing insert operations in the insert-log on the index.

4. The method of claim 3, wherein the step of incorporating the update from the log into an index of the database further comprises, for each index in the list of indexes, the steps of:

consulting the index to form a result set;

consulting the delete-log and subtracting delete-log results from the result set; and consulting the insert-log-to and adding insert-log results to the result-set.

5. The method of claim 4, wherein the step of consulting the delete-log comprises the steps of:

comparing a query key with an in-memory extent of keys in the delete-log;

storing the in-memory extent in a transaction context; and scanning the delete-log and retrieving data in the delete-log that intersect with the query key, if the in-memory extent overlaps with the query key.

6. The method of claim 5, wherein the step of scanning the delete-log comprises the step of:

specifying the query key as a filter condition.

7. The method of claim 4, wherein the step of consulting the insert-log comprises the steps of:

comparing a query key with an in-memory extent of keys in the insert-log;

storing the in-memory extent in a transaction context; and scanning the insert-log and retrieving data in the insert-log that intersect with the query key, if the in-memory extent overlaps with the query key.

8. The method of claim 7, wherein the step of scanning the insert-log comprises the step of:

specifying the query key as a filter condition.

9. The method of claim 4, wherein the database is a relational database.

10. The method of claim 9, wherein the database is a spatial database and the index is a spatial index on the spatial database.

11. The method of claim 10, wherein the index comprises a Quadtree index or an R-tree index.

12. The method of claim 9, wherein the database is an inventory control database.

13. The method of claim 12, wherein the inventory control database utilizes radio frequency identification tags.

14. The method of claim 1, wherein the step of incorporating the update from the log into an index of the database comprises the step of: performing array/batch updating of the index.

15. The method of claim 14 wherein the array/batch size is set in the range of 1000 to 10000.

16. A system for handling transactions including updates in a database management system comprising a processor to execute computer program instructions, a memory to store computer program instructions to be executed by the processor, and computer program instructions stored in the memory and to be executed to perform the steps of:

receiving an update to a database maintained by the database management system, the update causing an index of the database to be modified; recording the update in a log; and receiving an indication that the transaction is to be committed and in response, incorporating the update from the log into an index of the database;

wherein the update comprises an insert operation, which inserts data into the database, a delete operation, which deletes data from the database, or an update operation, which modifies data in the database;

wherein the step of receiving an update comprises the step of, in response to receiving the update, invoking a callback to update the index, wherein the step of invoking a callback comprises the step of passing information relating to the index and information identifying the data to be updated;

wherein the log comprises an insert-log storing insert operations and a delete-log storing delete operations; and wherein the step of recording the update in a log comprises the steps of: registering the callback with a transaction manager, if the update is the first update in the transaction;

including the index in a list of indexes used in the transaction, if the update is the first update to the index in the transaction;

if the update is an insert operation, inserting the insert operation into the insert-log;

if the update is a delete operation and there is not an insert operation corresponding to the data to be deleted in the insert-log, inserting the delete operation into the delete-log; and if the update is a delete operation and there is an insert operation corresponding to the data to be deleted in the insert-log deleting the insert from the insert-log.

17. The system of claim 16, wherein the step of recording the update in a log further comprises the steps of:

if the update is an update operation and there is an insert operation corresponding to the data to be deleted in the insert-log, updating the insert-log data with the new values in the update; and inserting the old value in the delete-log and the new value in the insert-log, otherwise.

18. The system of claim 16, wherein the step of incorporating the update from the log into an index of the database comprises the steps of:

retrieving the list of indexes used in the transaction;
for each index in the list of indexes, performing the steps of:
locking the index for update;
performing delete operations in the delete-log on the index; and
performing insert operations in the insert-log on the index.

19. The system of claim 18, wherein the step of incorporating the update from the log into an index of the database further comprises, for each index in the list of indexes, the steps of:

consulting the index to form a result set;
consulting the delete-log and subtracting delete-log results from the result set; and
consulting the insert-log-to and adding insert-log results to the result-set.

20. The system of claim 19, wherein the step of consulting the delete-log comprises the steps of:

comparing a query key with an in-memory extent of keys in the delete-log;
storing the in-memory extent in a transaction context; and
scanning the delete-log and retrieving data in the delete-log that intersect with the query key, if the in-memory extent overlaps with the query key.

21. The system of claim 20, wherein the step of scanning the delete-log comprises the step of:

specifying the query key as a filter condition.

22. The system of claim 19, wherein the step of consulting the insert-log comprises the steps of:

comparing a query key with an in-memory extent of keys in the insert-log;
storing the in-memory extent in a transaction context; and
scanning the insert-log and retrieving data in the insert-log that intersect with the query key, if the in-memory extent overlaps with the query key.

23. The system of claim 22, wherein the step of scanning the insert-log comprises the step of:

specifying the query key as a filter condition.

24. The system of claim 19, wherein the database is a relational database.

25. The system of claim 24, wherein the database is a spatial database and the index is a spatial index on the spatial database.

26. The system of claim 25, wherein the index comprises a Quadtree index or an R-tree index.

27. The system of claim 24, wherein the database is an inventory control database.

28. The system of claim 27, wherein the inventory control database utilizes radio frequency identification tags.

29. The system of claim 16, wherein the step of incorporating the update from the log into an index of the database comprises the step of:

performing array/batch updating of the index.

30. The system of claim 29, wherein the array/batch size is set in the range of 1000 to 5000.

31. A computer program product for handling transactions including updates in a database management system, the computer program product comprising a computer readable storage medium and computer program instructions recorded on the computer readable storage medium, executable by a processor, for performing the steps of:

receiving an update to a database maintained by the database management system, the update causing an index of the database to be modified;
recording the update in a log; and
receiving an indication that the transaction is to be committed and in response, incorporating the update from the log into an index of the database;
wherein the update comprises an insert operation, which inserts data into the database, a delete operation, which deletes data from the database, or an update operation, which modifies data in the database;
wherein the step of receiving an update comprises the step of, in response to receiving the update, invoking a callback to update the index, wherein the step of invoking a callback comprises the step of passing information relating to the index and information identifying the data to be updated;
wherein the log comprises an insert-log storing insert operations and a delete-log storing delete operations; and
wherein the step of recording the update in a log comprises the steps of: registering the callback with a transaction manager, if the update is the first update in the transaction;
including the index in a list of indexes used in the transaction, if the update is the first update to the index in the transaction;
if the update is an insert operation, inserting the insert operation into the insert-log;
if the update is a delete operation and there is not an insert operation corresponding to the data to be deleted in the insert-log, inserting the delete operation into the delete-log; and
if the update is a delete operation and there is an insert operation corresponding to the data to be deleted in the insert-log deleting the insert from the insert-log.

32. The computer program product of claim 31, wherein the step of recording the update in a log further comprises the steps of:

if the update is an update operation and there is an insert operation corresponding to the data to be deleted in the insert-log, updating the insert-log data with the new values in the update; and
inserting the old value in the delete-log and the new value in the insert-log, otherwise.

33. The computer program product of claim 31, wherein the step of incorporating the update from the log into an index of the database comprises the steps of:

retrieving the list of indexes used in the transaction;
for each index in the list of indexes, performing the steps of:
locking the index for update;
performing delete operations in the delete-log on the index; and
performing insert operations in the insert-log on the index.

34. The computer program product of claim 33 wherein the step of incorporating the update from the log into an index of the database further comprises, for each index in the list of indexes, the steps of:

consulting the index to form a result set;
consulting the delete-log and subtracting delete-log results from the result set;
consulting the insert-log and adding insert-log results to the result-set.

35. The computer program product of claim 34, wherein the step of consulting the delete-log comprises the steps of:
- comparing a query key with an in-memory extent of keys in the delete-log;
- storing the in-memory extent in a transaction context; and
- scanning the delete-log and retrieving data in the delete-log that intersect with the query key, if the in-memory extent overlaps with the query key.

36. The computer program product of claim 35, wherein the step of scanning the delete-log comprises the step of:
- specifying the query key as a filter condition.

37. The computer program product of claim 34, wherein the step of consulting the insert-log comprises the steps of:
- comparing a query key with an in-memory extent of keys in the insert-log;
- storing the in-memory extent in a transaction context; and
- scanning the insert-log and retrieving data in the insert-log that intersect with the query key, if the in-memory extent overlaps with the query key.

38. The computer program product of claim 37, wherein the step of scanning the insert-log comprises the step of:
- specifying the query key as a filter condition.

39. The computer program product of claim 34, wherein the database is a relational database.

40. The computer program product of claim 39, wherein the database is a spatial database and the index is a spatial index on the spatial database.

41. The computer program product of claim 40, wherein the index comprises a Quadtree index or an R-tree index.

42. The computer program product of claim 39, wherein the database is an inventory control database.

43. The computer program product of claim 42, wherein the inventory control database utilizes radio frequency identification tags.

44. The computer program product of claim 31, wherein the step of incorporating the update from the log into an index of the database comprises the step of performing array/batch updating of the index.

45. The computer program product of claim 44, wherein the array/batch size is set in the range of 1000 to 10000.

* * * * *

UNITED STATES PATENT AND TRADEMARK OFFICE
CERTIFICATE OF CORRECTION

| | | |
|---|---|---|
| PATENT NO. | : 7,490,084 B2 | Page 1 of 1 |
| APPLICATION NO. | : 10/948459 | |
| DATED | : February 10, 2009 | |
| INVENTOR(S) | : Ravikanth V. Kothuri, Siva Ravada and Ning An | |

It is certified that error appears in the above-identified patent and that said Letters Patent is hereby corrected as shown below:

On the title page item [73] under "Assignee" the name of the Assignee should be changed from --Oracle Corporation-- to "Oracle International Corporation"

Signed and Sealed this

Twenty-third Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,490,084 B2  Page 1 of 1
APPLICATION NO. : 10/948459
DATED : February 10, 2009
INVENTOR(S) : Kothuri et al.

It is certified that error appears in the above-identified patent and that said Letters Patent is hereby corrected as shown below:

In column 2, line 64, delete "insert -log" and insert -- insert-log --, therefor.

In column 11, line 50, in claim 4, delete "insert-log-to" and insert -- insert-log --, therefor.

In column 12, line 1, in claim 7, delete "insert -log" and insert -- insert-log --, therefor.

In column 12, line 1, in claim 7, delete "insert -log" and insert -- insert-log --, therefor.

In column 13, line 24, in claim 19, delete "insert-log-to" and insert -- insert-log --, therefor.

In column 13, line 42, in claim 22, delete "insert -log" and insert -- insert-log --, therefor.

In column 13, line 42, in claim 22, delete "insert -log" and insert -- insert-log --, therefor.

In column 14, line 65, in claim 34, after "set;" insert -- and --, therefor.

In column 15, line 17, in claim 37, delete "insert -log" and insert -- insert-log --.

Signed and Sealed this

Eighteenth Day of May, 2010

David J. Kappos
*Director of the United States Patent and Trademark Office*